United States Patent [19]

Rafter

[11] Patent Number: 5,297,846
[45] Date of Patent: Mar. 29, 1994

[54] PIVOTING BICYCLE SEAT ASSEMBLY

[76] Inventor: Michael W. Rafter, 633 33rd Ave. E., #2, Seattle, Wash. 98112

[21] Appl. No.: 989,209

[22] Filed: Dec. 14, 1992

[51] Int. Cl.$^5$ ............................................. B60N 2/38
[52] U.S. Cl. .................................. 297/195.12; 297/1; 297/236
[58] Field of Search .................... 297/1, 105, 195, 232, 297/234, 236, 195.1, 195.12, 195.13

[56] References Cited

U.S. PATENT DOCUMENTS

| | | |
|---|---|---|
| 483,266 | 9/1892 | Schindler . |
| 605,151 | 6/1898 | Twist .................................... 297/313 |
| 4,108,462 | 8/1978 | Martin ................................. 248/286 |
| 4,502,727 | 3/1985 | Holcomb et al. . |
| 4,884,842 | 12/1989 | Finkelstein ......................... 297/336 |
| 4,948,020 | 8/1990 | Smith . |
| 4,978,167 | 12/1990 | Harvey . |

FOREIGN PATENT DOCUMENTS

| | | | |
|---|---|---|---|
| 009627 | 6/1887 | Fed. Rep. of Germany ...... | 297/195 |
| 0006789 | of 1885 | United Kingdom ................ | 297/195 |

Primary Examiner—Paula A. Bradley
Assistant Examiner—James Miner
Attorney, Agent, or Firm—Craine & Jackson

[57] ABSTRACT

Disclosed herein is a bicycle seat assembly designed for optimal comfort and riding efficiency. The assembly includes a forward, upward extending, rigid support member adjustably attached to the seat tube on a bicycle. In one embodiment, the support member has an adjustable collar assembly which enables the support member to be attached to a standard seat post which is inserted into the seat tube. A v-shaped, extension arm is pivotally attached to the support member. The extension arm may be rotated between a rearward extending position and a forward extending position. The standard bicycle seat, called a primary seat structure herein, is attached to the top surface of one leg segment of the extension arm with a secondary seat structure is attached to the rear surface. When the extension arm is disposed in the rearward extending position, the primary seat structure may be used for normal riding. When the rider climbs an incline surface, the extension arm is rotated forward in a counter-clockwise clockwise direction to the forward extended position. In the extension arm is disposed in the forward extended position, the secondary seat structure is disposed in a position to support a rider in a standing position. The distance of the secondary seat structure is sufficient so that pedal distance is maintained for full leg extension.

16 Claims, 5 Drawing Sheets

PIVOTING BICYCLE SEAT ASSEMBLY

BACKGROUND OF THE INVENTION

1. Field of the Invention

This invention relates to bicycle seat assemblies and more particularly, to such bicycle seat assemblies which, during use, may be moved in different positions for optimal riding efficiency.

2. Description of the Related Art

It is well known that a bicycle seat should be adjusted in height so that the rider can sit comfortably and extend his legs fully when pedaling. The height of the bicycle seat, however, should not be so high that there is little or no clearance for the rider when he stands upright on the pedals to absorb road shocks.

When riding a bicycle, it is sometimes important that a rider adjust his relative position on the bicycle. For example, when riding the bicycle up a steep incline, the rider must lean forward on the bicycle so that his center of gravity is moved forward on the bicycle. When in this position, the rider is in a standing position on the bicycle and is able to fully extend his legs to deliver more power. Unfortunately, if the rider moves his center of gravity too far forward on the bicycle, an insufficient amount of weight will be applied to the rear wheel causing it to loose traction. Over a few minutes, this forward leaning position becomes fatiguing for the rider.

It is also well known that a rider must keep his center of gravity forward on the bicycle when riding up on a steep incline, so that a sufficient amount of weight is also applied over the front wheel. If the rider fails to lean forward a sufficient amount, the front wheel may lift causing the rider to lose control of the bicycle.

These problems are especially troublesome for mountain bike riders who often ride on paths or trails covered with loose dirt and debris.

The herein disclosed invention is designed to enable a bicycle rider to easily adjust his riding position on the bicycle when confronted with different riding conditions.

SUMMARY OF THE INVENTION

It is a general object of the present invention to provide a bicycle seat assembly attachable to a standard seat post which may be easily and quickly adjusted in different positions for riding up or down incline surfaces or on horizontal surfaces.

It is an object of the present invention to provide such a bicycle seat assembly which may be adjusted in position so that a rider maintains a sufficient amount of weight over the rear wheel of the bicycle for optimal traction.

It is another object of the present invention to provide such a bicycle seat assembly which may be adjusted so that a rider maintains a sufficient amount of weight over the front wheel for the bicycle for optimal directional control.

It is a further object of the present invention to provide such a bicycle seat assembly which enables the rider to achieve and maintain a riding position that is comfortable and allows full leg extension for maximum pedaling efficiency in any position.

These and other objects of the invention are met by providing a bicycle seat assembly that can be attached to a standard bicycle seat tube on a bicycle that may be moved into different positions to support the rider in different optimal riding positions.

The bicycle seat assembly comprises a rigid support member having means to be adjustably attached to a standard seat tube on a bicycle. The rigid support member has an upward, forward extending body portion. Attached to the body portion is a pivoting extension arm which may be rotated approximately 130° degrees between a rearward extending position and a forward extending position.

The extension arm is v-shaped with two integrally attached first and second leg segments aligned approximately 150 degrees apart. The first leg segment is pivotally attached to the support member. The second leg segment has a perpendicularly aligned top surface and a rear surface. Attached to the top surface is a first seat attachment means which enables a standard bicycle seat, hereinafter called a primary seat structure, to be attached thereto. Attached to the rear surface of the second leg segment is a second seat attachment means which enables a smaller secondary seat structure to be attached thereto. When assembled, the top planar surface of the secondary seat structure is perpendicularly aligned with the top planar surface of the primary seat structure.

The support member is designed to extend diagonally upward and forward over the top tube of the bicycle frame. The support member includes means for attaching it to the bicycle's seat tube. In one embodiment, the means includes a collar which may be adjustably fastened to a standard seat post which is inserted into the seat tube. In another embodiment, the means includes securely fixing the support member to a modified seat post which may be inserted into the seat tube.

The first leg segment of the extension arm is pivotally attached at one end to the support member. A rearward extending position stop means is provided on the support member which enables the extension arm to be aligned in a correct rearward extending position. When the extension arm is disposed in a correct rearward extending position, the second leg segment of the extension arm extends rearward directly over the end of the seat post. At the same time, the top planar surface of the primary seat structure is aligned for normal riding so that the rider may sit thereon and pedal comfortably. To adjust the height of the primary seat structure, either the location of the support member on the seat post or the length of the seat post in the seat tube may be adjusted.

When riding the bicycle upward on an incline surface, the bicycle's longitudinal axis is tilted upward and the seat tube's longitudinal axis is titled rearward. In order to continue riding, the rider must lean forward. To assist the rider, the extension arm is rotated forward in a clockwise direction from the rearward extending position, described above, to a forward extending position. When the incline surface is approximately 30° degrees, the top surface of the secondary seat structure is aligned in a substantially horizontal position. At the same time, the top surface of the primary seat structure is aligned in a substantially vertical position. When the extension arm is rotated into the forward extending position, the rider may continue to lean forward on the bicycle and rest comfortably on the secondary seat structure. By using the secondary seat structure in this manner, the rider's center of gravity is sufficiently moved forward on the bicycle so that sufficient weight is applied both to the rear and front wheels for optimal traction and control. A forward extending position stop means is attached to the support member which prevents excessive forward rotation of the extension arm when disposed in the forward extending position.

The length of the extension arm is sufficient so that when the extension arm is rotated to the forward extending position as described above, the distance between the top surface of the secondary seat structure and the pedals is approximately equal to the distance between the top surface of the primary seat structure to the pedals when the extension arm is in the rearward extending position. By maintaining the pedal distance in this manner, the rider is able maintain full leg extension when riding on all surfaces.

The bicycle seat assembly also includes an optional suspension assembly which is designed to provide greater comfort to the rider.

DESCRIPTION OF THE PREFERRED EMBODIMENT(S)

The present description of the invention is directed to its use on a mountain bike 90. It should be understood, that directing its use to a mountain bike 90 is for the sake of convenience or exemplification, and is not intended to be a limitation since the invention may be used with other types of bicycles.

Figure 1:
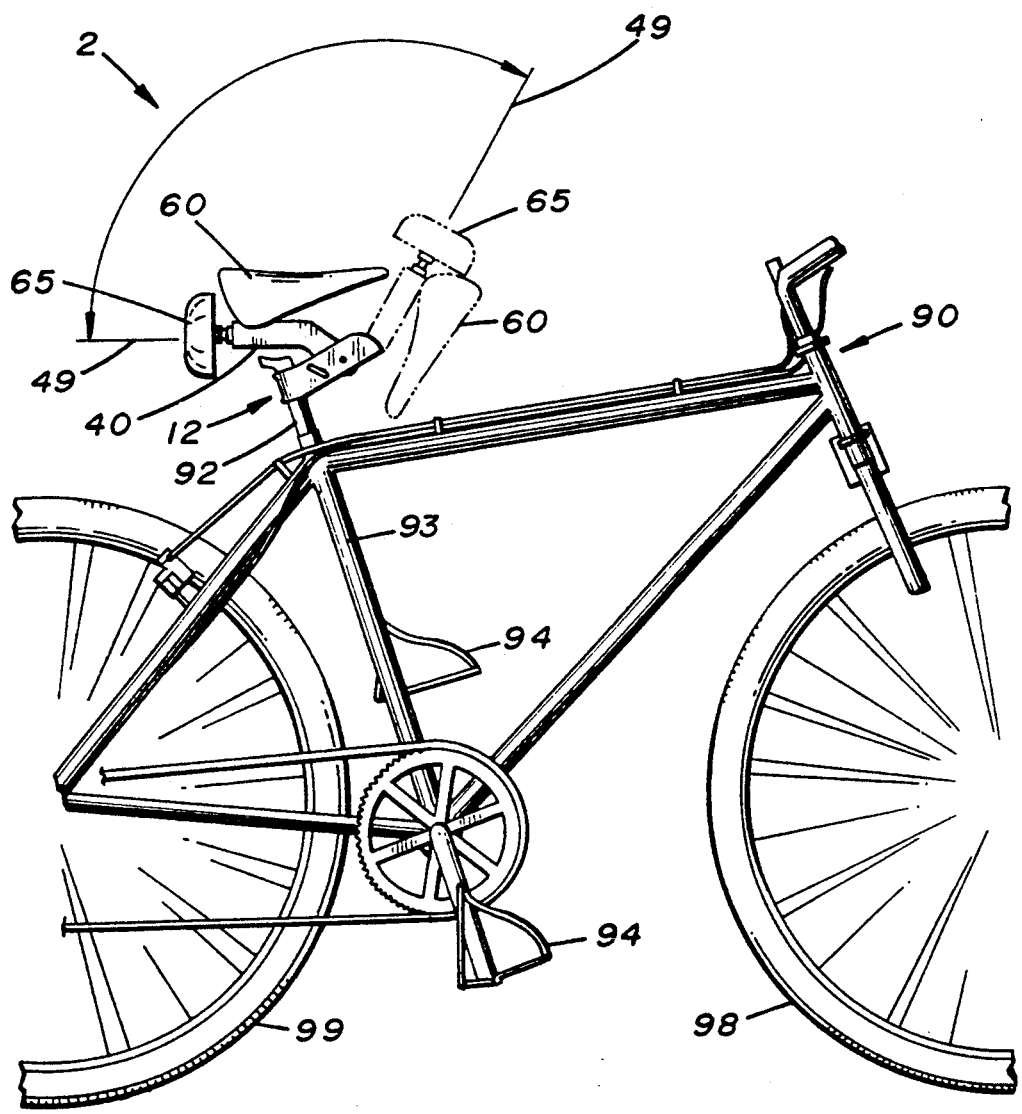
FIG. 1 is a side elevational view showing the bicycle seat assembly described herein attached to a mountain bike.

Referring to FIG. 1, there is shown a bicycle seat assembly, indicated as 2, comprising a rigid support member 12 adjustably attached to a standard seat tube 93 on the bike 90. As mentioned above, the bicycle seat assembly 2 is designed to allow a rider to adjust his or her relative position while riding the bike 90 so that a sufficient amount of weight may be maintained over the front and rear wheels 98, 99, respectively. The bicycle seat assembly 2 is also designed to allow the rider to rest comfortably on a seat structure when riding either in a normal position or in a standing position.

These and other objects are met by attaching a smaller secondary seat structure 65 to a pivoting extension arm 40 which may be selectively rotated between a rearward extending position and a forward extending position. The length and shape of the extension arm 40 is sufficient so that a secondary seat structure 65 when attached to the extension arm 40 is placed in a proper position when the extension arm is rotated forward so that when the rider sits thereon, his or her center of gravity is moved forward towards the front wheel 98.

Figure 2:
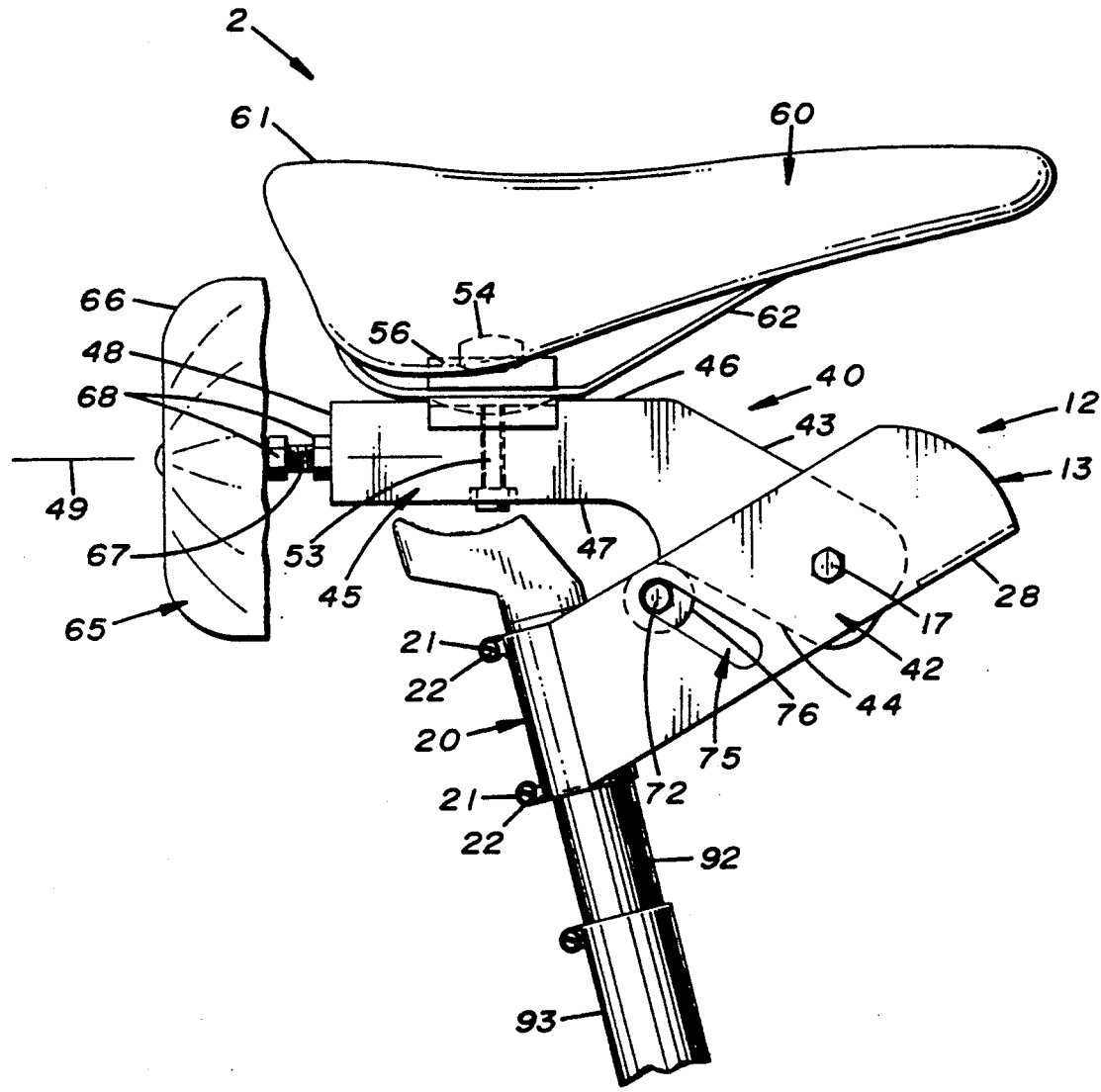
FIG. 2 is a side elevational view of the bicycle seat assembly disposed in a normal riding position.
Figure 4:
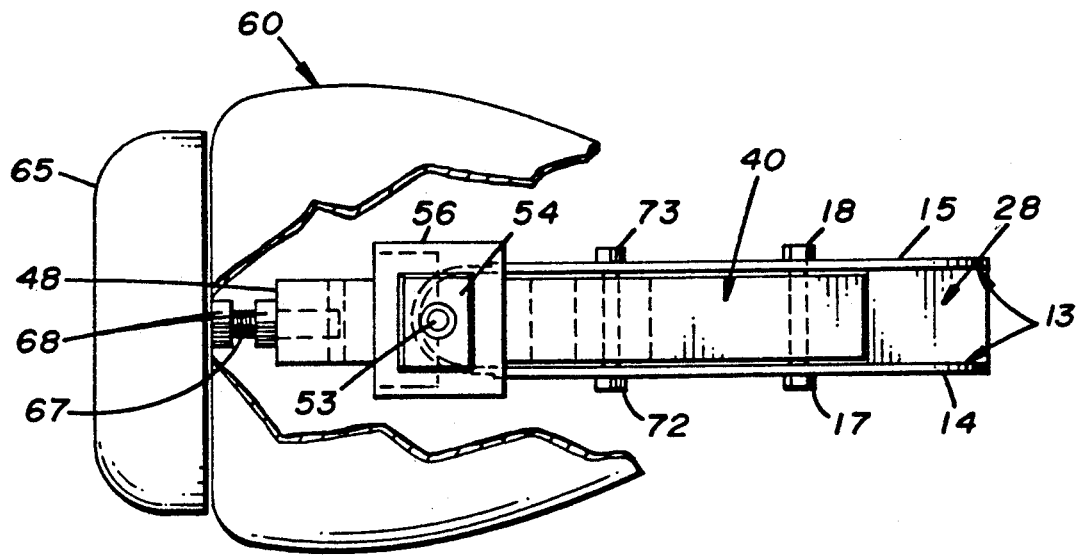
FIG. 4 is a top plan view of the bicycle seat assembly shown in FIGS. 1 and 2.
Figure 5:
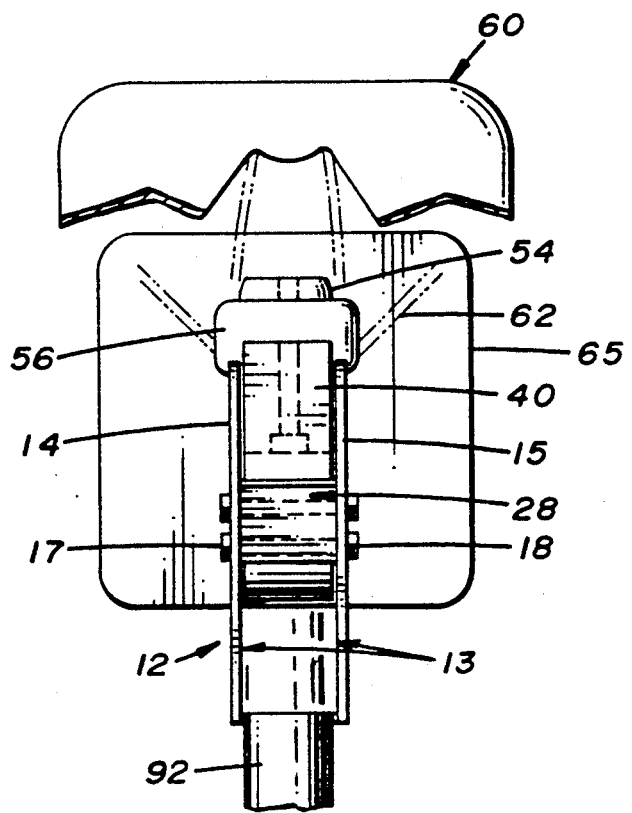
FIG. 5 is a front elevational view of the bicycle seat assembly shown in FIGS. 1, 2, and 4.

As shown in FIGS. 2, 4, and 5, the rigid support member 12 has an upward, forward extending body portion 13 that extends forward over the top tube of the bike 90. The body portion 13 measures approximately 5½×2×1 inches (L×H×W). In the preferred embodiment, the body portion 13 comprises two, parallel, planar, side members 14, 15, which are spaced apart approximately 1 inch. The distal end of each side member 14, 15 is curved upward and rearward to prevent possible impact injuries by the rider.

Figure 7:
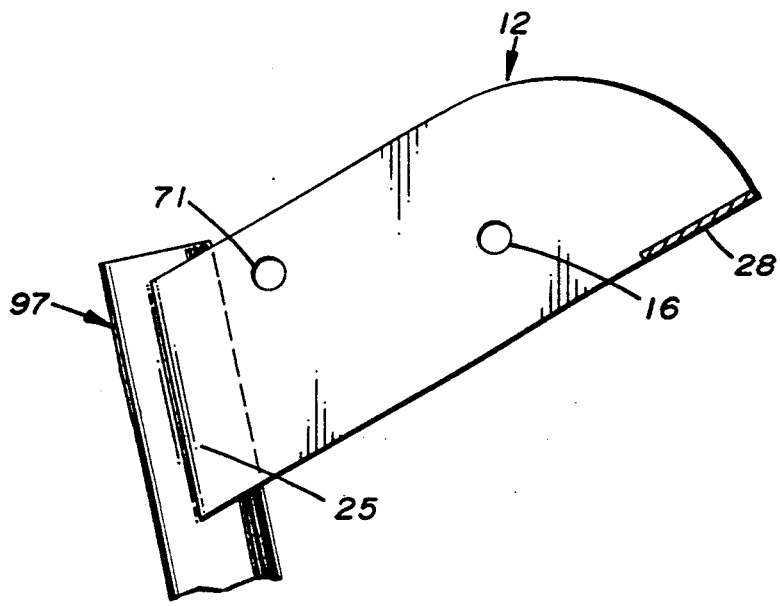
FIG. 7 is a side elevational view of another embodiment of the invention showing a fixed suspension assembly attached to the extension arm.

Manufactured centrally on each side member 14, 15 is a bore 16 as shown in FIG. 7, through which a horizontally aligned, transversing threaded bolt 17 measuring approximately 3/16 inch in diameter and 1⅜ inches in length may extend through. A complementary size threaded nut 18 is attached to the extending end of bolt 17 to securely hold it in place.

Figure 3:
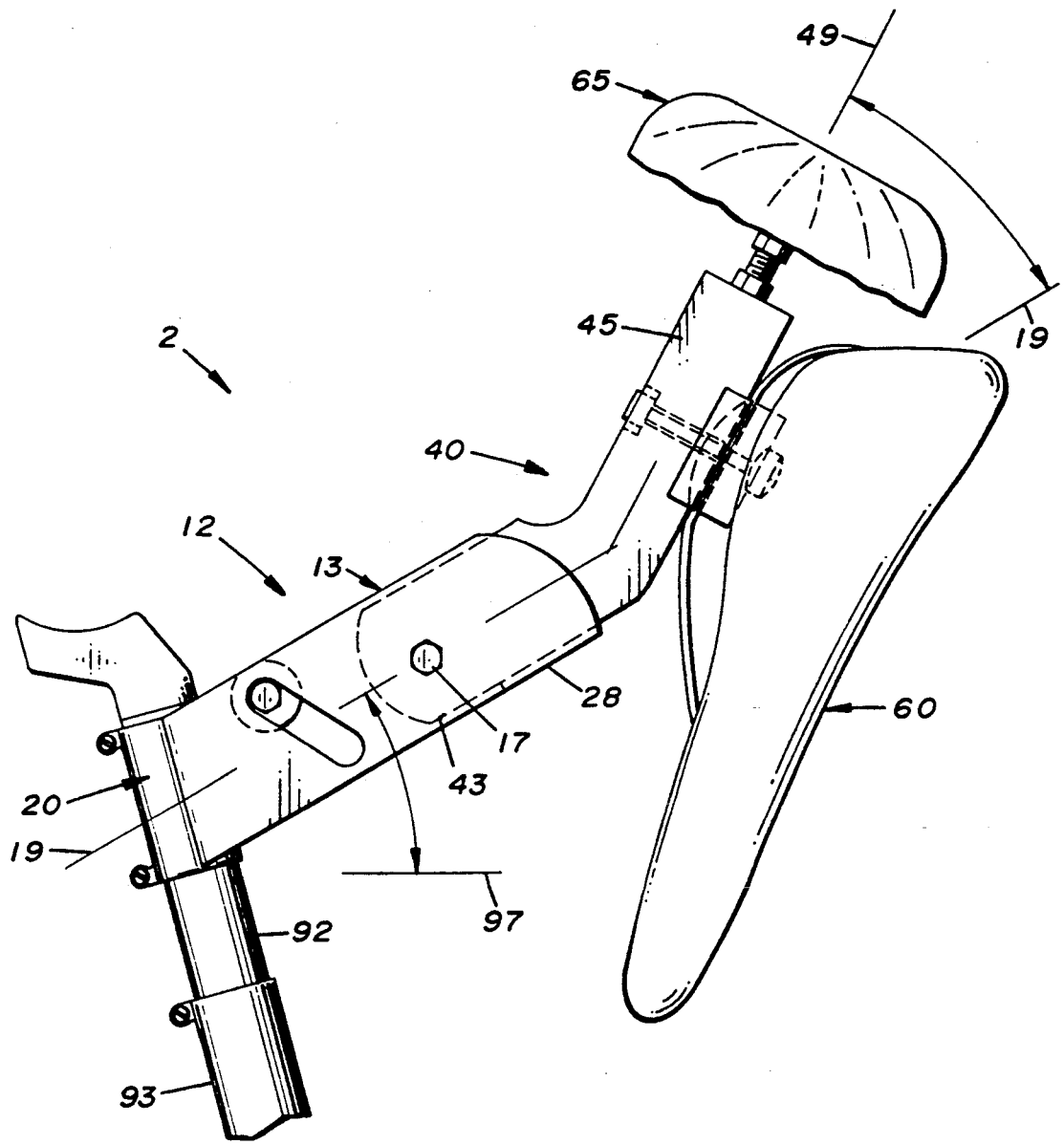
FIG. 3 is a side elevational view of the bicycle seat assembly shown in FIG. 2 showing the bicycle seat assembly being rotated into the forward extending position for riding in a stand up manner.

Attached between the lower surfaces of each side member 14 and 15 near their distal ends, is a planar stop surface 28 which connects the first and second side members 14, 15, together and acts as a forward extending position stop means to prevent excessive rotation of the extension arm 40 when disposed in a forward extending position. When the extension arm 40 is rotated into the forward extending position as shown in FIG. 3, the top surface 43 of the first leg segment 42 on the extension arm 40 contacts the stop surface 28 to prevent further rotational movement. It should be understood that other types of stop means, such as an extending lip structure or bolt, (not shown) could be used in place of stop surface 28.

In the preferred embodiment, the support member 12 includes means for adjustably attaching to the seat tube 93. In the embodiment shown in FIGS. 1–6, the means includes a clamping collar assembly 20 designed to be attached around a standard seat post 92 which is inserted into the seat tube 93. A typical seat tube 93 is aligned between 72° and 78° degrees above the bike's longitudinal axis 97. In order to properly position the extension arm 40, in the preferred embodiment the body section's longitudinal axis 19 is aligned approximately 30° degrees above the bike's longitudinal axis 97. The lower edges of the side members 14, 15 are attached to the outer surface of the collar assembly 20 on opposite sides thereof. A pair of upper and lower ears 21 are manufactured on the back side of the collar assembly 20 through which a bolt 22 is extended to securely hold the collar assembly 20 on the seat post 92. Nuts (not shown) are attached to the ends of the bolts 22 to tighten the bolts 22 thereto. By adjusting the position of the collar assembly 20 on the seat post 92, or by adjusting the length of the seat post 92 extending from the seat tube 93, the height of the support member 12 may be adjusted.

Alternatively, as shown in FIG. 7, the support member 12 may be fixed to a modified seat post 97. In this instance, side members 14, 15 are attached directly to the outside surface of the seat post 97. By adjusting the length of the seat post 97 extending from the seat tube (not shown), the height of the support member 12 may be adjusted.

In the preferred embodiment, the first and second side members 14, 15 are made of strong, lightweight aluminum material approximately 0.100 inch thick. It is contemplated that other types of strong, lightweight material, such as titanium, may be used instead.

Attached to the support member 12 is a pivoting, v-shaped extension arm 40 which is designed to rotate approximately 130 degrees between a rearward extending position as shown in FIG. 2 and a forward extending position, as shown in FIG. 3. Extension arm 40 comprises a first leg segment 42 and a second leg segment 45 aligned approximately 150° degrees apart.

The first leg segment 42 is rectangular in cross-section and slightly wider than the second leg segment 45 which is substantially square in cross-section. The first leg segment 42 has an upper flat surface 43 and a lower flat surface 44. The upper and lower flat surfaces 43, 44, respectively, are aligned in a substantially parallel manner with the lower surface of first leg segment 42 being manufactured round.

The top and bottom surfaces 46, 47, respectively, of the second leg segment 45 are substantially parallel and aligned at an obtuse angle of approximately 130° degrees relative to the upper and lower flat surfaces 43 and 44. The extension arm 40 is designed to freely rotate between the side members 14, 15 of the support member 12. In the preferred embodiment, the extension arm 40 is approximately 15/16th inches wide with the first leg segment 42 measuring approximately 3¼ inches in length and the second leg segment 45 measuring approximately 3¾ inches in length.

Figure 6:
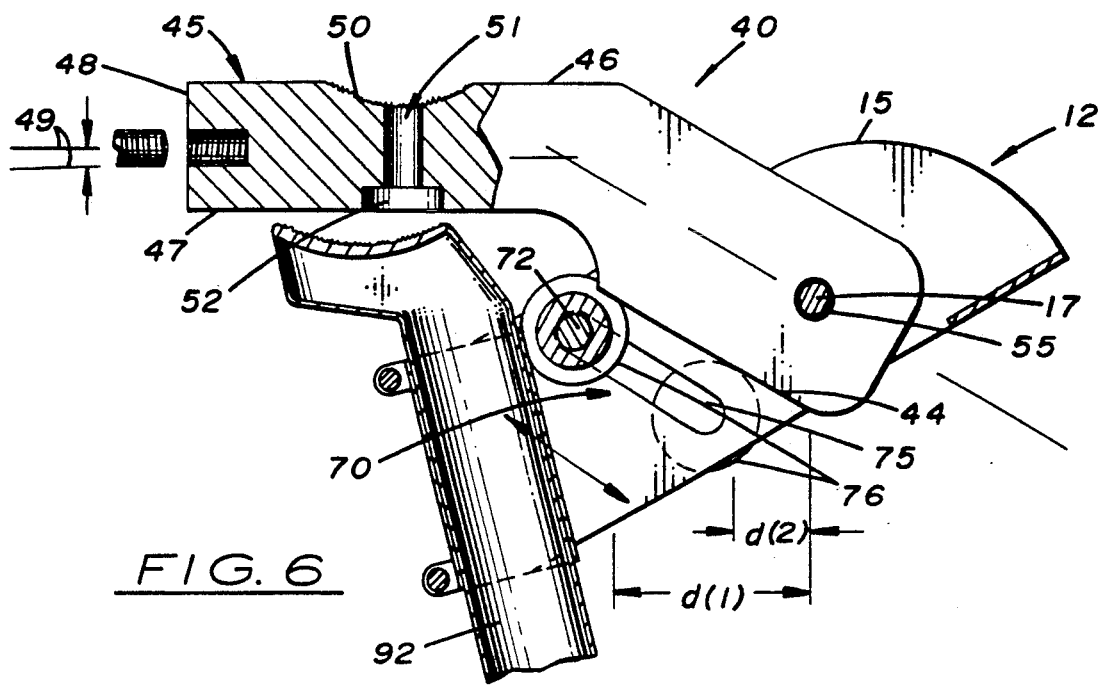
FIG. 6 is a side elevational view, partially in section, showing the construction of the extension arm with an optional adjustable suspension assembly attached thereto.

As shown in FIG. 2, a first seat attachment means is attached to the top surface 46 of the second leg segment 45 which enables a standard bicycle seat, hereinafter called a primary seat structure 60, to be attached to the extension arm 40. In the preferred embodiment, the first seat attachment means comprises a concave recessed surface 50, as shown in FIG. 6, manufactured centrally on the top surface 46 of second leg segment 45 and a standard, seat post adjustable nut 54. The recessed surface 50 is designed to receive the adjustable nut 54 which attaches to the rails 62 descending from the primary seat structure 60. A centrally located bore 51 is manufactured through the recessed surface 50. The lower portion of bore 51 is removed creating a seat 52 for the head of a bolt 53 to rest therein to connect the adjustably nut 54 to the extension arm 40. It should be understood that other types of seat attachment means may be used to attach the primary seat structure 60 to the extension arm 40.

Manufactured centrally and aligned transversely on the extension arm 40 is a 5/16 inch diameter bore 55. During assembly, a bolt 17 is extended through the bore 55 and used to pivotally attach the extension arm 40 on the support member 12.

Disposed medially on the support member 12 between the bore 16 on each side member 14 and 15 and the collar assembly 20 is a first stop means which is used to align the extension arm 40 in the rearward extending position. In the preferred embodiment, the first stop means comprises a transversely aligned bolt 72 located adjacent to the extension arm 40. During use the lower surface 44 of the first leg segment 42 of extension arm 40 rests agains the bolt 72.

In the preferred embodiment, the first stop means is combined with a suspension assembly which includes at least one grommet 76 made of elastic material attached to the bolt 72. In another embodiment, a continuous slot 75 is manufactured through the support member 12 through which bolt 72 and grommet 76 may be inserted.

Slot 75 extends from side member 14 to side member 15 and is aligned with its longitudinal axis aligned upward and rearward at approximately 45° degrees. Slot 75 is approximately 1¼ inches in length and 3/16 inch in width. In the preferred embodiment two grommets 76 are attached in an end to end manner to bolt 72 with each measuring approximately 5/16 inch in length and one inch in diameter.

During manufacturing, the grommets 76 are placed in an end-to-end manner between the side members 14 and 15 with their central holes (not shown) aligned with the slot 75. A bolt 72 is then inserted through the slot 75 to hold the grommets 76 in position. A nut 73 is then attached to the extended end of the bolt 72 to securely hold the bolt 72 in place.

As shown in FIGS. 1 and 6, slot 75 is located on support member 12 so that the lower surface 44 of the first leg segment 42 on extension arm 40 is supported by bolt 72 when disposed in the rearward extending position.

The grommets 76 which are made of elastic material, such as rubber or latex, act as a suspension means for the extension arm 40. Being elastic, they are resistance to compressive forces. Therefore, any downward force applied by the extension arm 40 to the outer surface of the grommets 76 is resisted.

By using a continuous slot 75, the user is able to adjust the relative position of the grommets 76 on the support member 12. This allows the user to introduce slight rotational movement or "play" in the extension arm 40. For example, as shown in FIG. 6, when bolt 72 is placed near the upper end of the slot 75, the distance d(1) from the bolt 17 to the outer edge of the grommets 76 is relatively large. When the bolt 17 is placed in this position, very little rotational movement of the end of the extension arm 40 is permitted which, in turn, provides a relatively stiff for the rider. When the bolt 72 is placed at the lower end of the slot 75, the distance d(2) from the bolt 17 to the outer edge of the grommets 76 is reduced which increases the leverage force applied to the outer surface of the grommets 76. As a result, a smaller amount of rotational movement of the end of the extension arm 40 is permitted which produces a softer ride for the rider. By adjusting the position of the bolt 72 in the slot 75, the rider is able to select the type of ride provided.

In another embodiment shown in FIG. 7, the slot 75 is replaced with a bore 71 which holds the bolt 72 in a fixed position on the extension arm 40.

As shown in FIGS. 2-4, attached to the rear surface 48 of the extension arm 40 is a secondary seat structure 65. The secondary seat structure 65 is attached thereto by a threaded bolt 67 disposed between the bottom surface of the secondary seat structure 65 and the rear surface 48. Locking nuts 68 are attached to the bolt 67 which enables the secondary seat structure 65 to be adjusted in height. In the preferred embodiment, the secondary seat structure 65 is rectangular when viewed from a top plan view and measures approximately 4×4×1 inches (L×W×H).

When the secondary seat structure 65 is attached to the extension arm 40, the top planar surface 66 of the secondary seat structure 65 is substantially perpendicular to the top planar surface 61 or the primary seat structure 60. The length of the extension arm 40 is sufficient so that when rotated to the forward extending position, as described below, the distance from the top planar surface 66 of the secondary seat structure 65 to the pedals 94 is approximately equal to the distance from the top planar surface 61 of the primary seat structure 60 to the pedals 94. This allows the rider to maintain proper pedal distance when leaning forward on the bike 90.

As mentioned above, the support member 12 is attached to the seat post 92 and extends therefrom upward and forward over the top tube of the bike 90. When riding the bike 90 on a flat or down an incline surface, the extension arm 40 is positioned so that the longitudinal axis 49 of the second leg segment 45 is aligned substantially parallel to the bike's longitudinal axis. When disposed in this position, the extension arm extends over the end of the seat post 92 or 97. Also, since the primary seat structure 60 is attached to the extension arm 40, its top planar surface 61 is aligned substantially parallel to the bike's longitudinal axis for normal riding.

When riding the bike 95 up an incline surface, the extension arm 40 is rotated in a clockwise direction from the rearward extended position, described above, to a forward extending position as shown in FIG. 3. When disposed in this new position, the longitudinal axis 49 of the second leg segment 45 is disposed approximately 30° degrees above the support member's longitudinal axis 19. At the same time, the primary seat structure 60 is disposed with its top planar surface 61 aligned downward. When placed in this position, the rider may sit on the secondary seat structure 65 and pedal comfortably. By rotating the secondary seat structure 65 upward and forward in this manner, the rider is able to easily and quickly adjust his center of gravity on the bike 95 so that sufficient weight is applied both to the rear and front wheels 98, 99, respectively, when riding up a steep incline. At the same time, the desired pedal distance is maintained for full leg extension.

In compliance with the statute, the invention has been described in language more or less specific as to structural features. It should be understood, however, that the invention is not limited to the specific features shown since the means and construction shown comprises the preferred forms of putting the invention into effect. The invention is, therefore, claimed in any of its forms or modifications within the legitimate and valid scope of the claims, appropriately interpreted in accordance with the doctrine of equivalents.

I claim:

1. A bicycle seat assembly capable of being attached to a seat tube on a bicycle, comprising;
   a. a rigid support member, said support member having attachment means capable of aligning and attaching said support member in an upward, forward extending position from said seat tube on a bicycle;
   b. an angled extension arm, said extension arm having a first leg segment and a second leg segment, said first leg segment being pivotally attached to said support member by a pivoting means, said second leg segment having a top surface and a rear surface, said top surface having a first seat attachment means;
   c. a primary seat structure attached to said first seat attachment means;
   d. a secondary seat structure attached to said rear surface of said extension arm;
   e. a first stop means manufactured on said support member, said first stop means being capable of aligning said extension arm in a rearward extended position with said primary seat structure being disposed in a normal riding position on said bicycle, and;
   f. a second stop means manufactured on said support member, said second stop means being capable of aligning said extension arm when said extension arm is rotated into a forward extended position so that said secondary seat structure is able to support a forward leaning rider when riding said bicycle up an incline surface.

2. A bicycle seat assembly as recited in claim 1, wherein said first stop means includes a transversely aligned bolt attached to said support member and below said extension arm.

3. A bicycle seat assembly, as recited in claim 2, further comprising at least one grommet attached around said bolt, said grommet being made of elastic material resistant to compression forces exerted thereon, so that when downward force is applied by said extension arm on said grommet, said downward force is resisted to improve riding comfort.

4. A bicycle seat assembly, as recited in claim 3, further including an elongated, continuous slot manufactured on said rigid support member enabling said bolt and said grommet to be adjustably position on said rigid support member, said continuous slot being aligned on said support member so that the distance from said bolt and said grommet to said pivoting means on said extension arm may be adjusted.

5. A bicycle seat assembly as recited in claim 4 wherein said attachment means comprises a collar assembly capable of being adjustably attached to a typical seat post attached to said seat tube on said bicycle.

6. A bicycle seat assembly as recited in claim 4 wherein said attachment means comprises said support member being rigidly fixed to a typical seat post capable of being attached to said seat tube.

7. A bicycle seat assembly capable of being attached to a seat tube on a bicycle, comprising:
   a. a rigid support member capable of being attached to said seat tube on said bicycle, said support member having a distal end and a proximal end, said support member having means for attaching said proximal end of said support member to a bicycle;
   b. a v-shaped extension arm pivotally attached to said support member, said extension arm having a first leg segment and a second leg member, said first leg segment having a lower surface, said second leg segment having a top surface and a rear surface;
   c. a primary seat attached to said attachment means;
   d. a first seat attachment means attached to said top surface of first leg segment of said extension arm, said first seat attachment means being capable of attaching said primary seat to said extension arm;
   e. secondary seat structure attached to said rear surface of said extension arm, and;
   f. a first stop means disposed between said extension arm and said support member, said first stop means being capable of disposing said extension arm in a rearward extending position when said primary seat attached to said extension arm is aligned in a normal riding position, and;
   g. a second stop means disposed between said extension arm and said support member, said second stop means being capable of disposing said extension arm in a forward extending position so that said secondary seat structure is moved to an upward and forward position capable of supporting a rider leaning forward on said bicycle.

8. A bicycle seat assembly as recited in claim 7, wherein said first stop means includes a transversely aligned bolt attached to said support member and aligned below to said extension arm to support said extension arm thereon.

9. A bicycle seat assembly as recited in claim 8, further including a drommet attached to said bolt to reduce any downward force exerted on said bolt by said extension arm when riding said bicycle.

10. A bicycle seat assembly, as recited in claim 9, wherein said suspension means further includes an elongated continuous slot manufactured on said rigid support member enabling said bolt and grommet to be adjustably position on said rigid body, said slot being aligned on said support member so that the distance from said bolt and said grommet to said pivoting means on said extension arm may be adjusted.

11. A bicycle seat assembly as recited in claim 10 wherein said attachment means comprises a collar assembly capable of being adjustably attached to a typical seat post attached to said seat tube.

12. A bicycle seat assembly as recited in claim 11 wherein said attachment means comprises said support member being fixed to a typical seat post capable of being attached to said seat tube.

13. A bicycle seat assembly capable of being attached to a seat tube on a bicycle, comprising:
 a. a rigid support member having a body section and a collar assembly, said collar assembly capable of being adjustably attached to said seat post and capable of aligning said body section in an upward, forward extending position therefrom;
 b. a v-shaped extension arm, said extension arm having a first leg segment and a second leg segment, said first leg segment being pivotally attached to said body section of said support member, said first leg segment having a lower surface, said second leg member having a perpendicularly aligned top surface and rear surface, said extension arm capable of being rotated between a rearward extending position and a forward extending position;
 c. an adjustable suspension assembly attached to said rigid support member, said suspension assembly capable of supporting said extension arm in a rearward extending position when attached to said rigid support member, said suspension assembly also capable of being adjusted to allow small vertical movement of said extension arm to provide a softer rider for said rider on said bicycle;
 d. a first seat attachment means attached to said top surface of said second leg member of said extension arm;
 e. a primary seat structure attached to said first seat attachment means;
 f. a second seat attachment means attached to said rear surface of said second leg member of said extension arm, and;
 g. a secondary seat structure attached to said second seat attachment means on said extension arm.

14. A bicycle seat assembly, as recited in claim 13, wherein said body section includes a first and a second parallel side members.

15. A bicycle seat assembly, as recited in claim 14, wherein said body section extends forward and upward from said seat tube approximately 73° degrees.

16. A bicycle seat assembly, as recited in claim 15, wherein said first and said second leg segments are aligned approximately 130° degrees apart.

* * * * *